(12) United States Patent
Crawford et al.

(10) Patent No.: US 7,496,701 B2
(45) Date of Patent: *Feb. 24, 2009

(54) MANAGING VIRTUAL SERVER CONTROL OF COMPUTER SUPPORT SYSTEMS WITH HEARTBEAT MESSAGE

(75) Inventors: Timothy J. Crawford, Beaverton, OR (US); Brandon L. Hunt, Berthoud, CO (US); Brian A. Rinaldi, Tucson, AZ (US); Richard A. Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 666 days.

This patent is subject to a terminal disclaimer.

(21) Appl. No.: 10/991,781

(22) Filed: Nov. 18, 2004

(65) Prior Publication Data

US 2006/0107284 A1    May 18, 2006

(51) Int. Cl.
*G06F 13/10* (2006.01)
*G01R 31/00* (2006.01)

(52) U.S. Cl. ............................................. 710/62; 714/1
(58) Field of Classification Search .................. 710/62; 726/15; 714/1, 13

See application file for complete search history.

(56) References Cited

U.S. PATENT DOCUMENTS

| | | | |
|---|---|---|---|
| 5,553,287 A | 9/1996 | Bailey et al. | |
| 5,633,999 A | 5/1997 | Clowes et al. | |
| 5,825,880 A * | 10/1998 | Sudia et al. | 713/180 |
| 6,477,648 B1 * | 11/2002 | Schell et al. | 726/22 |
| 6,493,824 B1 * | 12/2002 | Novoa et al. | 713/162 |
| 7,085,961 B2 * | 8/2006 | Chang et al. | 714/13 |
| 7,124,264 B2 * | 10/2006 | Yamashita | 711/162 |
| 2002/0133728 A1 * | 9/2002 | Agarwal | 713/324 |
| 2003/0065896 A1 | 4/2003 | Krueger | |
| 2003/0120743 A1 | 6/2003 | Coatney et al. | |

OTHER PUBLICATIONS

Tierney, Brian L. et al., "Using High Speed Networks to Enable Distributed Parallel Image Server Systems," IEEE, 1994.

Besse, L. et al., "Large scale multipurpose interactive image processing facility at ETH-Zurich," Proceedings of the SPIE—The International Society for Optical Engineering, vol. 301, pp. 154-161, 1981.

(Continued)

*Primary Examiner*—Henry W. H. Tsai
*Assistant Examiner*—Hyun Nam
(74) *Attorney, Agent, or Firm*—Quarles & Brady LLP

(57) ABSTRACT

A computer system includes a support system that report events, faults, and failures to a master virtual server. While the support system may be accessed and used by a multitude of virtual servers, only the master virtual server can manage the support system. The support system include a master lock register, a heartbeat timer, and a digital processing device ("processor"). Upon initialization and if the master lock register is empty, a virtual server asserts ownership over the support system by writing its identification into the master lock register, becoming the master virtual server. The master virtual server transmits periodic heartbeats to the support system to communicate that it is still viable and in control. If the heartbeat timer expires without communication from the master virtual server, the processor clears the master lock register and transmits a broadcast message inviting all connected virtual servers to attempt to assert control.

28 Claims, 4 Drawing Sheets

OTHER PUBLICATIONS

Griffin, J.M. et al., "NCR MODUS: a data management subsystem," Proceedings of the Second International Conference and Workshop on Picture Archiving and Communication Systems (PACS II) for Medical Applications, May 1983, pp. 138-144.

* cited by examiner

MANAGING VIRTUAL SERVER CONTROL OF COMPUTER SUPPORT SYSTEMS WITH HEARTBEAT MESSAGE

BACKGROUND OF THE INVENTION

1. Field of the Invention

This invention is related in general to the field of data storage systems. In particular, the invention consists of a system for managing computer support systems.

2. Description of the Prior Art

In FIG. 1, a computer storage system 10 includes host servers ("hosts") 12, data processing servers 14, a data storage system 16, and various support systems 18 such as power supplies 18a, batteries 18b, fans 18c, and temperature sensors 18d. Each data processing server 14 may include a plurality of processing devices grouped into a processing cluster ("cluster") 20 and may be substantially identical and redundant. Imposed upon the physical components of the computer storage system 10 may be a multitude of virtualized storage servers referred to as images 22 as shown in FIG. 2. Each image 22 typically resides on two or more clusters. In the event of a cluster failure, however, an image 22 can failover to the remaining clusters.

The support systems 18 are hardware devices that provide services other than data storage. Each image 22 typically has access to and can use these devices. Additionally, these support devices 18 may have the ability to generate reports related to events, faults, and failures. However, only one image 22 should own each support system 18, i.e., be responsible for accepting these reports, for responding to the events, faults, and failures, and for managing these support systems. The owning image is referred to as the master image. However, each image may access the services of the support systems. Accordingly, it would be desirable to have a system for establishing ownership over a support system 18 while allowing other images to access the support system.

One approach is to provide a separate set of support systems 18 for each hardware image. However, this approach is extremely expensive as multiple devices are necessary and each may be dramatically underutilized. Therefore, it is desirable to have a system for establishing ownership over a support system 18 that is efficient and economical.

Another approach is to utilize a static multi-tiered architecture that allows one image to own the hardware while other images access the devices through the owning image via image-to-image communication. However, a problem occurs if the image 22 tasked with managing the support systems 18 fails, precluding use of the support systems 18 by the other viable images. Accordingly, it is desirable to have a system for dynamically establishing ownership over support systems 18.

In a traditional dynamic system, a system user can establish a master image. Subsequently, if the master image fails or is taken off-line, the system user can establish a different master image. However, this approach requires active intervention on the part of a system user. If the system user is not immediately available, the support systems 18 will go unmanaged and all images may be precluded from accessing the support systems. Therefore, it is desirable to have a dynamic system for establishing a master image that does not require active intervention by a system user.

A predetermined hierarchy of dynamic ownership allows ownership to pass from one image to another without intervention by a system user. A default profile may be established including a primary master image with associated secondary master images. However, this profile must be modified each time a hierarchy of images changes. Accordingly, it is desirable to have a system of dynamic ownership that is itself established dynamically.

In U.S. Pat. No. 5,553,287, Bailey et al. disclose a computer system for switchably connecting an input/output ("I/O") device to a host via a channel subsystem in connection with means for dynamically managing I/O connectivity. Bailey's invention includes a centralized control lock associated with hardware resources. However, no resources are provided for identifying which image is responsible for managing each hardware resource. It is desirable to have a master lock that identifies the owning image.

In U.S. patent application 2003/0120743 A1, Coatney et al. disclose a system for implementing ownership including writing ownership information to a predetermined area of a device. However, no provision has been made to ensure that a master image remains viable. In other words, if a master image assumes ownership over a support system 18 and then fails, the support system may be unaware of the failure of the master image. Normally, this situation would require that a new master image be selected through image-to-image communication. This requires that the images be aware of each other. However, it is sometimes desirable to have independent systems on common hardware, precluding the use of image-to-image communication. Accordingly, it is desirable to have a system for establishing a master image that does not require image-to-image communication, is scalable, and does not require system user intervention, failover profiles, or significant downtime.

SUMMARY OF THE INVENTION

The invention disclosed herein utilizes a master lock register that can be accessed by each virtualized server ("image") within a computer system. A master lock register may reside within each support system or on a device responsible for monitoring a plurality of support systems. When an image is established, it accesses the master lock register to ascertain if a master lock has already been allocated. If not, the image writes its identification ("ID") to the master lock register, becoming the master image. As long as the image's ID remains in the master lock register, the image owns the support systems associated with the master lock register. Multiple requests for the master lock are serialized by the master lock register and only one device can assert its ID.

While each image in the computer system may access and use the support system, only the master image is responsible for receiving reports related to support system events, faults, and failures. Additionally, only the master image may manage the associated support system.

In order to ensure that the support system is actively managed, the master image must send a periodic message ("heartbeat") to the support system. Any form of regular communication between the master image and the support system may serve as a heartbeat. Along with the master lock register, the support system includes a heartbeat timer and a digital processing device ("processor"). If the heartbeat timer expires due to lack of communication by the master image, the processor clears the master lock registers and transmits a broadcast message indicating that the support system needs a new master image. This broadcast message triggers each connected image to attempt to posses the master lock, just as they would do during initialization. This allows for ownership to dynamically pass from one image to another without image-to-image communication, system user intervention, failover profiles, and significant downtime between ownership.

The master lock may also be periodically polled by all images to check for ownership. This allows the support system to clear the master lock when it fails to receive a heartbeat message and precludes the need to transmit a broadcast message.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

This invention is based on the idea of using a master lock register, a heartbeat timer, and a digital processing device to dynamically establish ownership of one or more support services in a computer system. The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays ("FPGAs"), application-specific integrated circuits ("ASICs"), complex programmable logic devices ("CPLDs"), programmable logic arrays ("PLAs"), microprocessors, or other similar processing devices.

Figure 1:
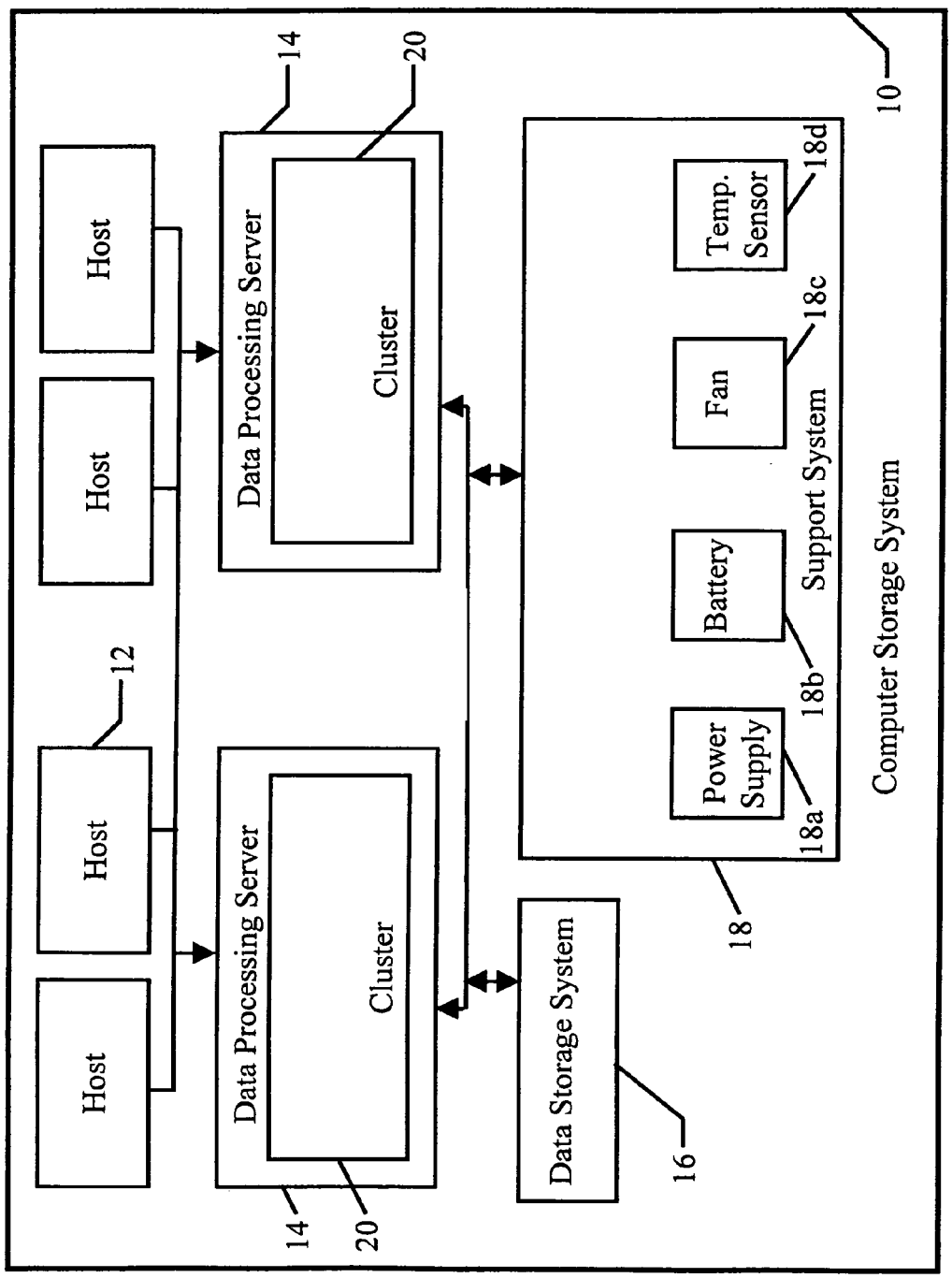
FIG. 1 is a block diagram illustrating a computer storage system including host servers, data processing servers, data storage devices, and a support system.
Figure 2:
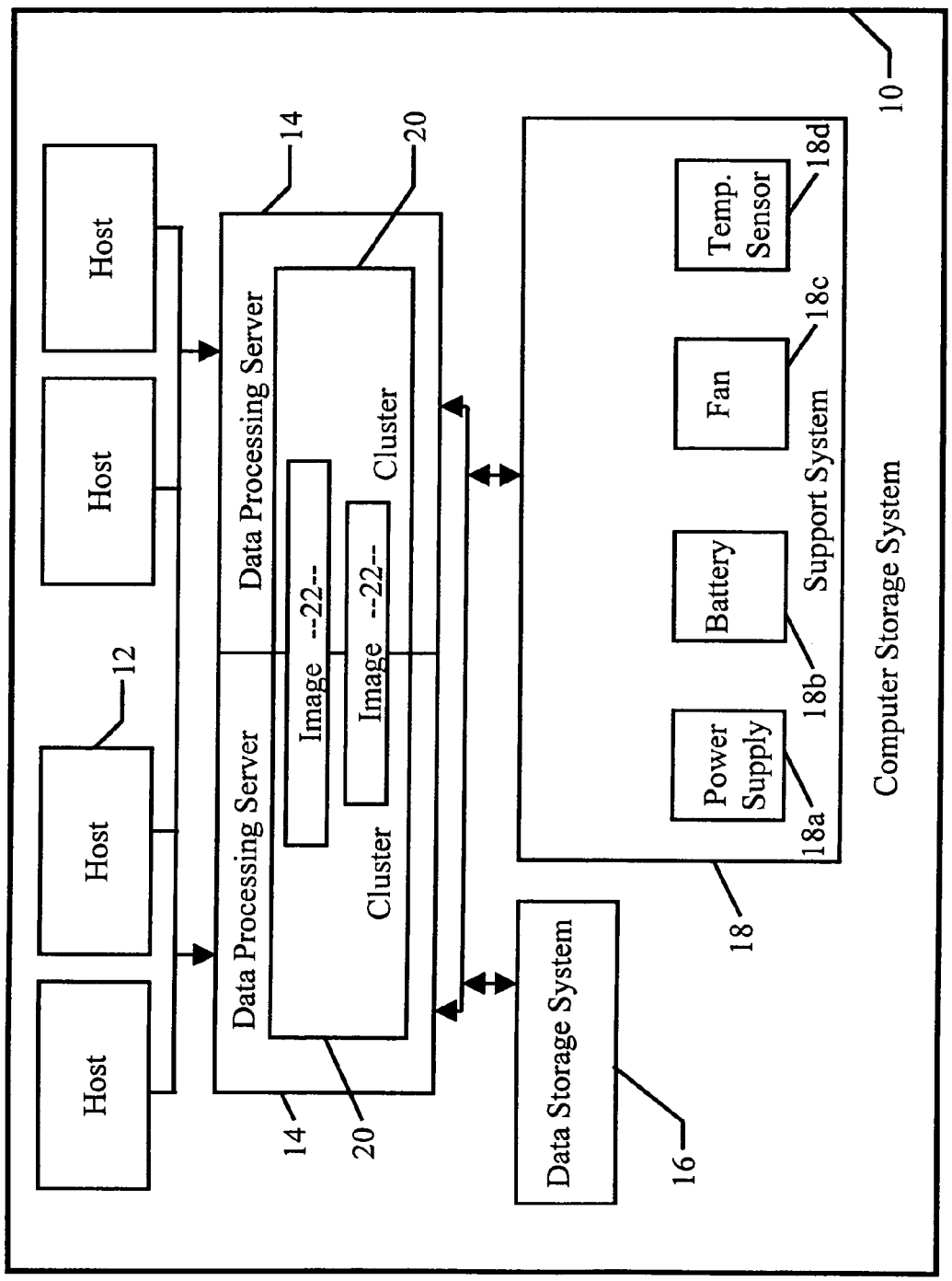
FIG. 2 is a block diagram illustrating the computer storage system of FIG. 1 with a plurality of virtualized servers ("images").
Figure 3:
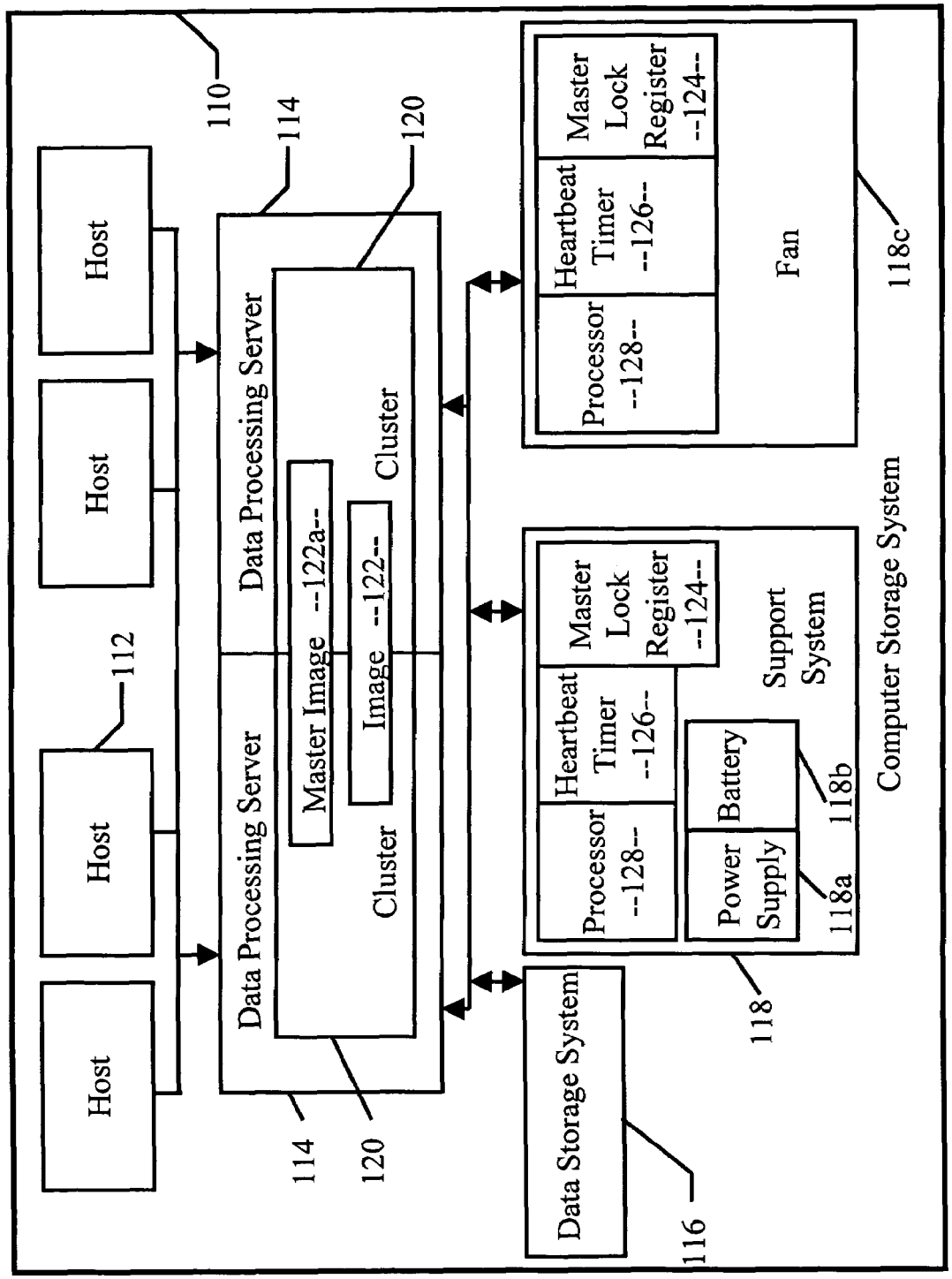
FIG. 3 is a block diagram of a computer storage system according to the invention including a master lock register, a heartbeat timer, and a digital processing device ("processor").

Referring to figures, wherein like parts are designated with the same reference numerals and symbols, FIG. 3 is a block diagram illustrating a computer storage system 110 that includes host servers ("hosts") 112, data processing servers 114, a data storage system 116, and a support system 118. The data storage system may be a multitude of individual data storage devices such as hard disk drives, optical drives, and tape-cartridge drives. Each data processing server 114 may include a plurality of processing devices grouped into a processing cluster ("cluster") 120 and may be substantially identical and redundant. The processing devices may be microprocessors, general-purpose central processing units ("CPUs"), or programmable logic devices such as FPGAs, CPLDs, PLAs, or ASICs.

The support services 118 include a master lock register 124, a heartbeat timer 126, and a digital processing device ("processor") 128. The master lock register 124 may be a memory location within a memory device or a register within the processor 128. The heartbeat timer 126 may be a hardware device including an internal clock signal or may also by a logical construct within the processor. The processor 128 may be a micro-controller, a general purpose CPU, or a programmable logic device such as an FPGA, CPLD, PLA, or ASIC.

Imposed upon the physical components of the computer storage system 110 is a multitude of virtualized storage servers referred to as images 122. Each image 122 typically resides on two or more clusters. In the event of a cluster failure, however, an image 122 can failover to the remaining clusters. Failover can be expanded to independent servers, or non-server devices. Any sort of complex array of systems, whether the systems are low level simple HW devices or complex enterprise-level servers, can make use of this system to coordinate master status.

The support system 118 is a hardware device that provide services other than data storage. In this embodiment of the invention, the support system 118 is a power controller card connected to a power supply 118a and a battery 118b. Alternatively, the support system could be an input/output device, an operator panel, a remote power switch, a fan device, or a fan sense card. Support systems need not be power-related. For example, a service console could be an example of a supporting device which should only be owned by one of multiple devices at any given.

Each support system can have its own independent master lock which is individually maintained, or the master lock can be maintained in a roll up device. For example, the master lock for an entire power system can be maintained in a power controller card, and the system that owns that lock owns the entire power system. In another embodiment, individual resources can have their own master lock and can be obtained independently. A classic example of this dichotomy is that a master lock could be implemented in each fan, or in a fan sense card representing a number of fans. The power controller cards ownership represents an ownership of the power system at large. Choice of implementation is dependent on the devices used, and the system complexity.

Each image 122 typically has access to and can use these devices. Additionally, the support system 118 generates reports related to events, faults, and failures. However, only one image 122 may own each support system 118, i.e., be responsible for accepting these reports, for responding to the events, faults, and failures, and for managing these support systems. The owning image is referred to as the master image 122a. The invention may also be implemented in a stand-alone support device. For example, a support service device 18c includes its own master lock register 124, heartbeat timer 126, and processor 128. Indeed, the master lock can be owned by one device, multiple devices but synchronized (you own one you own them all), or multiple non-synchronized devices (each image can lock each device independently)

Figure 4:
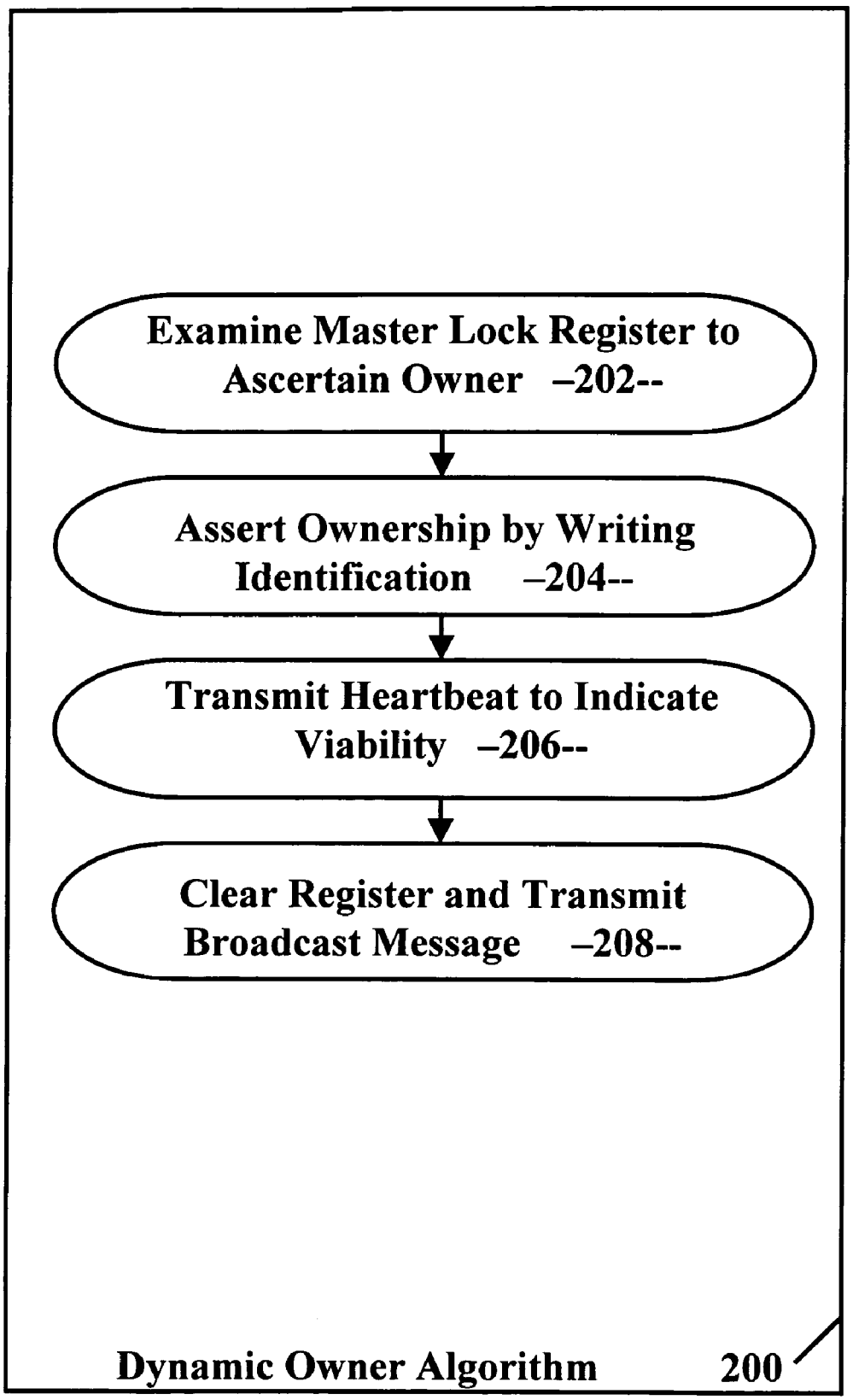
FIG. 4 is a flow chart illustrating a dynamic owner algorithm.

The process of dynamically establishing a master image is illustrated by the dynamic owner algorithm 200 of FIG. 4. Each master lock register 124 can be accessed by each image 122. When an image 122 is initialized, it examines the master lock register 124 in step 202 to ascertain if a master lock has already been allocated. If not, the image writes its identification ("ID") to the master lock register in step 204, becoming the master image. As long as the image's ID remains in the master lock register, the image owns the support systems associated with the master lock register. Multiple requests for the master lock are serialized by the master lock register and only one device can assert its ID. This approach works well when images are differently configured with resources such as CPUs, memory, or bandwidth.

Systems can be designed such that one image has priority or precedence in getting the lock. For example, a first image may get first chance at the lock and the others only get to try if the first image is unsuccessful. All images other than the first image are treated equally and have equal opportunity to own the master lock. This design works well for systems where each image is identical or near identical.

While each image in the computer system may access and use the support system, only the master image is responsible for receiving reports related to support system events, faults, and failures. Additionally, only the master image may manage the associated support system, i.e., manage the repair or replacement of the support system. In order to ensure that the support system is actively managed, the master image sends a periodic message ("heartbeat") to the support system in step 206. In one implementation, a specific heartbeat message would be required so that the supporting system can determine that the master image is aware of the need to maintain the master lock. In another implementation, any form of regular communication between the master image and the support system may serve as a heartbeat. The second approach would be preferred in cases where the performance hit in doing the extra heartbeat message is undesired, but the former approach is preferred for systems where there is very infrequent communication, or where simplicity of target support devices is a priority.

Along with the master lock register, the support system includes a heartbeat timer and a digital processing device ("processor"), ASIC, microcontroller, or common central processor.

If the heartbeat timer expires due to lack of communication by the master image, the processor clears the master lock registers and transmits a broadcast message indicating that the support system need a new master image in step 208. This broadcast message triggers each connected image to attempt to posses the master lock, just as they would do during initialization. Alternatively, all non-master images capable of becoming a master image may be required to poll the status of the master lock and look for lock vacancy. The former approach reduces overhead at the image, the latter approach reduces overhead and complexity at the support device. This broadcast message or detection of a vacant lock by one non-master image would trigger images to attempt to posses the master lock, just as they would do during initialization. This allows for ownership to dynamically pass from one image to another without image-to-image communication, system user intervention, failover profiles, and significant downtime between ownership.

There are instances where an image might detect the vacant lock, but choose not to attempt to contend for the master lock. For example, if there is ongoing service or maintenance being done on an image, that image may determine that it is not capable or appropriate to obtain the master lock at this point. Likewise, if an image is being currently deactivated, it would not want to take the lock because it would soon be vacating the lock as well. Devices should seek to churn the lock as infrequently as possible in systems where the overhead inherent in lock arbitration is an issue. Optionally, systems can detect and track the arbitration progress of the master lock. For example, one implementation would have each image tracking how many times the lock is vacated, or how long the lock remains vacant, and, when appropriate, a service or maintenance action might be requested, initiated, or suggested when the lock has remained free too long or been in a prolonged state or repeated arbitration.

Those skilled in the art of making computer support systems may develop other embodiments of the present invention. However, the terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A support system management device, comprising:
a support system including a master lock register adapted to hold an identification ("ID"); and
a plurality of virtual servers, each having an ID corresponding to each of said plurality of virtual servers, including a first image that is adapted to write a first ID corresponding to the first image to the master lock register, and to become a master image,
wherein the master image transmits a periodic heartbeat message to the support system to indicate that the master image is viable and in control of the support system; and
wherein the support system further includes a heartbeat timer and a processor wherein,
if the heartbeat timer expires before the support system receives the periodic heartbeat message, the processor clears the master lock register and transmits a broadcast message to the plurality of virtual servers;
wherein, when said plurality of virtual servers receive said broadcast message, in response to receiving said broadcast message, each of said plurality of virtual servers capable of controlling the support system transmits an ID corresponding to each of said plurality of virtual servers to said support system, and
wherein a first received ID by the support system from one of said plurality of virtual servers is written into said master lock register, and the control of said support system is written into said master lock register, and the control of said support system is passed to the virtual server corresponding to the first received ID written into said master lock register.

2. The support system management device of claim 1, wherein the plurality of virtual servers examine the master lock register to ascertain if the master lock register is empty.

3. The support system management device of claim 1, wherein the support system includes a power supply.

4. The support system management device of claim 1, wherein the support system includes a battery.

5. The support system management device of claim 1, wherein the support system includes a fan.

6. The support system management device of claim 1, wherein the support system includes a temperature sensor.

7. The support system management device of claim 1, wherein the support system includes a power controller card.

8. A method of managing a support system, comprising the steps of:
providing a plurality of virtual servers, each having an identification ("ID") corresponding to each of said plurality of virtual servers, including a first image that is adapted to write a first ID corresponding to the first image to a master lock register of the support system, and to become a master image;
transmitting a periodic heartbeat message by the master image to the support system to indicate that the master image is viable and in control of the support system, wherein the support system further includes a heartbeat timer;
when the heartbeat timer expires before the support system receives the periodic heartbeat message, a processor clears the master lock register and transmits a broadcast message to the plurality of virtual servers; and examining the master lock register to ascertain if it is empty; wherein, if the master lock register is empty, causing said plurality of virtual servers to transmit their respective identifications to the support system, writing a first received ID by the support system to the master lock register, passing the control of the support system to the virtual server with the first received ID written to the master lock register.

9. The method of claim 8, further comprising the step of, if a heartbeat timer expires before the heartbeat message is received by the support system, clearing the master lock register.

10. The method of claim 8, wherein the support system includes a power supply.

11. The method of claim 8, wherein the support system includes a battery.

12. The method of claim 8, wherein the support system includes a fan.

13. The method of claim 8, wherein the support system includes a temperature sensor.

14. The method of claim 8, wherein the support system includes a power controller card.

15. An article of manufacture stored on a data storage medium, said data storage medium including a set of machine-readable instructions that are executable by a processing device to implement an algorithm comprising steps of:

managing a plurality of virtual servers, each having an identification ("ID") corresponding to each of said plurality of virtual servers, including a first image that is adapted to write a first ID corresponding to the first image to a master lock register of a support system, and to become a master image, the support system further includes a heartbeat timer and a digital processing device;

transmitting a periodic heartbeat message to the support system to indicate that the master image is viable and in control of the support system, wherein the support system further includes a heartbeat timer;

when the heartbeat timer expires before the support system receives the periodic heartbeat message, a processor clears the master lock register and transmits a broadcast message to the plurality of virtual servers; and if the master lock register is empty, causing said plurality of virtual servers to transmit their respective identifications to the support system, writing the-first a first received ID by the support system to the master lock register, passing the control of the support system to the virtual server with the first received ID written to the master lock register.

16. The article of manufacture of claim 15, further comprising the step of, if a heartbeat timer expires before the heartbeat message is received by the support system, clearing the master lock register.

17. The article of manufacture of claim 16, wherein the support system includes a power supply.

18. The article of manufacture of claim 16, wherein the support system includes a battery.

19. The article of manufacture of claim 16, wherein the support system includes a fan.

20. The article of manufacture of claim 16, wherein the support system includes a temperature sensor.

21. The article of manufacture of claim 16, wherein the support system includes a power controller card.

22. A method of providing a service for managing a support system operating in conjunction with a plurality of virtual servers capable of exercising control over the support system, wherein each of the plurality of virtual servers has an associated identification ("ID"), comprising integrating computer-readable code into a computing system, wherein the computer-readable code in combination with the computing system is capable of performing the following steps:

providing the plurality of virtual servers, each having an ID corresponding to each of said plurality of virtual servers, including a first image that is adapted to write a first ID corresponding to the first image to a master lock register of the support system, and to become a master image;

transmitting a periodic heartbeat message by the master image to the support system to indicate that the master image is viable and in control of the support system, wherein the support system further includes a heartbeat timer:

when the heartbeat timer expires before the support system receives the periodic heartbeat message, a processor clears the master lock register and transmits a broadcast message to the plurality of virtual servers; and if the master lock register is empty causing said plurality of virtual servers to transmit their respective identifications to the support system, writing a first received ID by the support system to the master lock register, passing the control of the support system to the virtual server with the first received ID written to the master lock register.

23. The method of providing a service of claim 22, further comprising the step of, if a heartbeat timer expires before the heartbeat message is received by the support system, clearing the master lock register.

24. The method of claim 22, wherein the support system includes a power supply.

25. The method of claim 22, wherein the support system includes a battery.

26. The method of claim 22, wherein the support system includes a fan.

27. The method of claim 22, wherein the support system includes a temperature sensor.

28. The method of claim 22, wherein the support system includes a power controller card.

* * * * *